Aug. 8, 1967  A. CHOQUETTE  3,334,440
WATER AND HUMIDITY DISTRIBUTOR FOR PLANTS
Filed Sept. 24, 1965
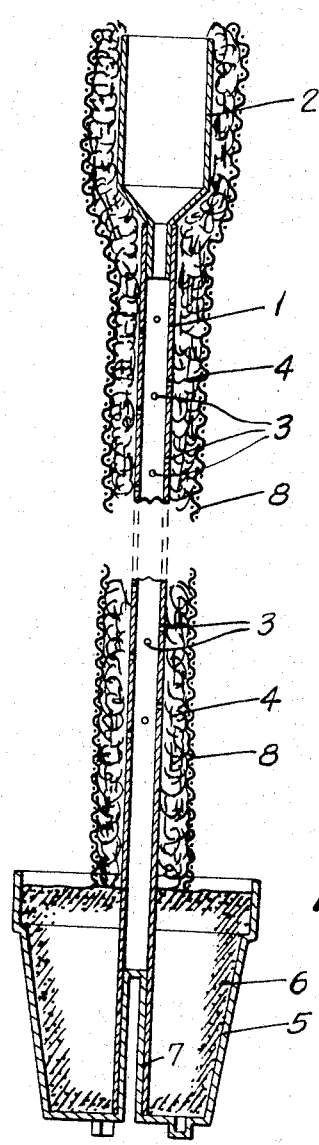
Fig. 1
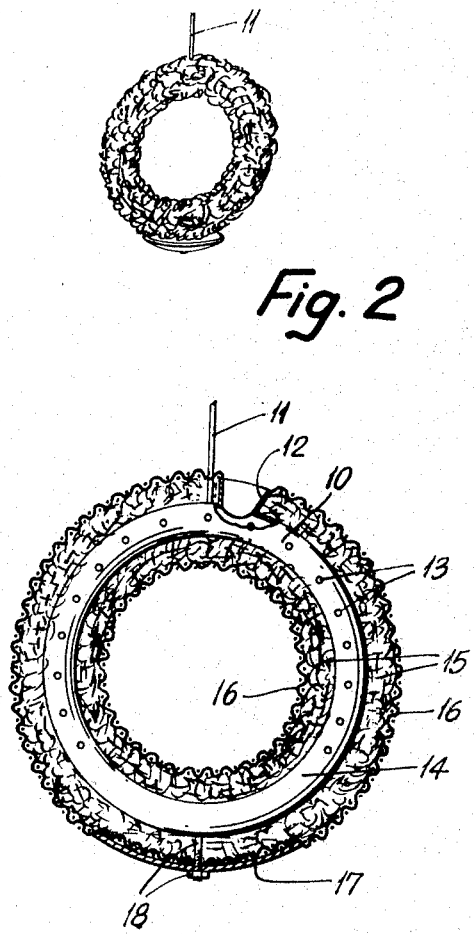
Fig. 2
Fig. 3
INVENTOR
Aimé CHOQUETTE
BY Pierre L'espérance
PATENT AGENT

United States Patent Office 3,334,440
Patented Aug. 8, 1967

3,334,440
WATER AND HUMIDITY DISTRIBUTOR FOR PLANTS
Aime Choquette, 12375 Jeanne Mance St., Montreal, Quebec, Canada
Filed Sept. 24, 1965, Ser. No. 489,836
1 Claim. (Cl. 47—35)

The present invention relates to the art of growing plants and, more particularly, to a method and means for watering and humidifying plants having aerial roots and grown indoors.

Difficulty is often experienced in growing plants having aerial roots under indoor conditions. Plants which produce aerial roots, or stem-producing roots, such as Philodendron, Monstera (bread fruit or cut leaf philodendron), Scindapsus (pothos), and numerous species of Anthurium, Rhodospatha, Syngonium (arrow-head), and many other similar plants, which originally came from humid tropical climates, are very difficult to grow indoors because, in homes provided with heating systems, although the temperature is sufficiently high, the humidity is much too low.

Under these conditions, the plants fail to grow properly and eventually die and are most susceptible to the attack of insects and diseases. On the other hand, the methods and systems used by plant growers in hot houses and the like, in which, for instance, the entire atmosphere is kept very humid or in which the plants are watered at very frequent intervals, cannot naturally be used by home owners and in public buildings.

It is therefore the general object of the present invention to provide a method and a device for watering and humidifying the atmosphere immediately surrounding the aerial roots of the plant of the above-noted types and species with excellent results in the rapid and healthy growth of the plants, said system and device being easily used by any home owner and by persons servicing public buildings and the like.

Another object of the present invention relates to a water and humidity distributor for plants having aerial roots, which is of very simple and inexpensive construction, which requires a minimum of upkeep and will give a prolonged service.

The foregoing and other important objects of the present invention will become more apparent during the following disclosure and by referring to the drawings, in which:

FIGURE 1 is a longitudinal section of a first embodiment in accordance with the invention;

FIGURE 2 is an elevation of a second embodiment; and

FIGURE 3 is a longitudinal section, on an enlarged scale, of the embodiment of FIGURE 2.

Referring now more particularly to the drawings in which like reference characters indicate like elements throughout, the device in accordance with the first embodiment of the present invention consists essentially of an upright elongated water distributor consisting of an upright tube 1, closed at its bottom end and in communication at its upper end with a funnel 2 for facilitating filling the tube with water.

Tube 1 is provided with a series of small perforations, or orifices 3 terminating short of the lower end of tube 1, and is completely surrounded by a porous water-absorbing and water-evaporating element 4. Element 4 is preferably sphagnum-moss, but could be any other type of natural moss and can be also replaced by a synthetic water-absorbing material, such as foam plastic, in which the holes communicate between each other from the inside to the outside surface of the foam plastic material.

Element 4 could also be made of any other water-absorbing material, such as natural fibres, provided these fibres are water-absorbent, such as cotton, wool, and the like.

In the embodiment shown, tube 1 must have sufficient rigidity to stand upright and may be made of a synthetic resin, or of metal. The lower end of tube 1 is closed and is supported by suitable means in upright position in the case where the device is used with plants, the ground roots of which are no longer required after, for instance, the plant has acquired a certain growth. However, in accordance with the first embodiment of the invention, a flower pot 5, filled with earth 6, is used for both supporting the tube 1 and water-absorbing medium or element 4 and for providing earth to receive the ground roots of the plant.

Pot 5 is provided with a central upstanding stem 7, of circular cross-sectional shape, depending from the bottom of pot 5 and adapted to be inserted within the lower end of tube 1 to close the same and to support the tube in upright position.

If desired, tube 1 can be provided with a water-proof partition just above the upper end of stem 7. However, in practice, this is not necessary because the tight-fitting tube 1 on stem 7 makes a water-proof joint.

The medium, or element 4, may be supported around tube 1 by means of strings, wires, or the like, surrounding the same, but preferably by means of a netting or screen 8, made of woven synthetic resin fibres or of woven metal wire. The screen, or netting 8, must be fairly rigid and would normally have ½" mesh; it forms a kind of a cylinder completely surrounding the water-absorbing medium 4 and also preferably surrounding the funnel 2 to hide the latter from view.

When an organic moss is used as the element 4, such as sphagnum-moss, it should be sufficiently thick so as to form a mat of at least ½" thickness so as to retain the necessary moisture.

The plants are either seeded or transplanted in the earth 6 of pot 5 and, as they grow, they develop aerial roots which will either adhere or be close to the water-absorbing medium 4 so as to absorb water therefrom and also from the air in the immediate vicinity of the element 4, said air being humidified thereby. It will be noted that element 4 serves also as a support for the plant.

Tube 1 is filled with water by means of funnel 2. The water immediately starts to discharge through small diameter orifices 3 and is absorbed by element 4, which becomes moistened. Tube 1 becomes empty down to the level of the lowermost perforation or orifice 3, element 4 having absorbed all of the water discharged by tube 1 substantially evenly along the length of element 4.

Orifices 3 terminate short of the lower end portion of element 4 so as to prevent water in tube 1 from reaching the earth 6 in pot 5. Earth 6 is watered separately in conventional manner.

FIGURES 2 and 3 show another embodiment of the invention, in which the device is completely suspended from a ceiling or the like. It comprises an annular tube 10 suspended from a string, cable, or the like 11, attached at its upper end to the ceiling or the like. The upper portion of the tube is in communication with and carries a funnel element 12, which may be an integral part of the tube and the tube is provided with a plurality of small orifices 13 extending all through the upper half-portion and partially through the lower half-portion, except for the bottom zone 14 which is apertureless. A porous water-absorbing and water-evaporating element 15 completely surrounds annular tube 10 and may consist of sphagnum moss, or the like, as for element 4.

Element 15 is maintained around annular tube 10 by a screen, or netting 16, as in the previous embodiment.

A pan 17 is secured to the lower portion of tube 10 by means of, for instance, a nut and bolt 18. Pan 17 has a longitudinally curved shape to conform to the annular shape of the assembly of netting 16, element 15, and tube 10, and a transversely curved shape to conform to the transverse circular shape of said assembly, so as to partially cover the bottom zone of the netting 16.

Pan 17 is adapted to be filled with earth and to be maintained in spaced position with respect to netting 16, as shown in FIGURE 2, when the pan is in use, for starting the plants recently transplanted so that the earth contained in pan 17 will receive the ground roots of said plants. However, when the plants have started to develop and have aerial roots clinging to netting 16 and element 15, the bottom portion of the plant having the ground roots may be cut off and the pan 17 completely removed or cleaned of earth and screwed tight against the netting, the plants now clinging to the assembly solely through their aerial roots.

Water filling tube 10 and funnel 12 is discharged in a few minutes through orifices 13 into element 15 to moisten the same, and the water evaporates at the outer surface of element 15 so as to be absorbed by the aerial roots of the plant.

In one and the other of the embodiments described, it is noted that the orifices 13 do not extend all the way to the bottom portion of the tube, or of the bottom portion of elements 4 or 15, but terminate short of the bottom portions of said elements, because, due to the increase of water pressure in the tube, sufficient water is discharged through the lowermost orifices to fully moisten not only the element portions opposite thereto, but the portions extending under the same.

While a preferred embodiment in accordance with the invention has been illustrated and described, it is understood that various modifications may be resorted to without departing from the scope of the appended claim.

What I claim is:

A watering and humidifying device for plants having aerial roots, comprising a water impermeable tube bent into an annulus, means to support said annulus in a vertical plane, said tube having an opening at the upper end of said annulus for filling said annular tube with water, said tube having a plurality of holes made therethrough around said tube, except for the lowermost portion of said annulus, a water-absorbent and water evaporating element completely surrounding said annular tube, screen or netting material of large mesh size surrounding said element and retaining the same around said tube, and an imperforate pan suspended from the bottommost portion of said tube and partially surrounding the bottommost portion of said element, said pan adapted to contain earth, and means to detachably secure said pan to said tube.

References Cited
UNITED STATES PATENTS

| | | | |
|---|---|---|---|
| 545,952 | 9/1895 | Fitz-Gerald | 47—38.1 X |
| 774,988 | 11/1904 | Maurer | 47—38.1 |
| 2,964,877 | 12/1960 | Gauding | 47—38.1 |
| 3,063,196 | 11/1962 | Pauer | 47—34.12 |
| 3,188,771 | 6/1965 | Ballai | 47—38.1 X |

ABRAHAM G. STONE, *Primary Examiner.*

R. C. CARTER, A. E. KOPECKI, *Assistant Examiners.*